United States Patent [19]
Wilson et al.

[11] 3,722,549
[45] Mar. 27, 1973

[54] CAP AND LOCKING MEANS THEREFOR

[75] Inventors: Fred A. Wilson, Florence, Ky.; Lindol H. Sprague, Deer Park, Ohio

[73] Assignee: Dover Corporation, Cincinnati, Ohio

[22] Filed: Mar. 19, 1971

[21] Appl. No.: 126,365

Related U.S. Application Data

[63] Continuation of Ser. No. 821,290, May 2, 1969, abandoned.

[52] U.S. Cl. ..........138/89, 292/257, 166/92, 220/55, 285/311
[51] Int. Cl..........................................F16l 55/10
[58] Field of Search ......138/89; 137/247.47, 247.51; 292/256.5, 256.65, 256.69, 256.75, 257, 258, 30, 256; 166/92–94, 192; 220/55 P, 55 T, 57; 285/311, 320

[56] References Cited

UNITED STATES PATENTS

| 1,200,266 | 10/1916 | Strausser | 138/89 X |
|---|---|---|---|
| 3,476,154 | 11/1969 | Ludeman | 138/89 |
| 128,207 | 6/1872 | Booth et al. | 138/89 X |
| 838,093 | 12/1906 | Emmous | 138/89 |
| 1,682,879 | 9/1928 | Wilson | 292/258 |

FOREIGN PATENTS OR APPLICATIONS

| 757,093 | 10/1933 | France | 138/89 |
| 11,179 | 0/1896 | Great Britain | 138/89 |
| 120,178 | 6/1927 | Switzerland | 138/89 |

*Primary Examiner*—Herbert I. Ross
*Attorney*—Kinney & Schenk

[57] ABSTRACT

A cap for closing the end of a pipe has a pair of locking arms pivotally mounted thereon for cooperation with an inclined surface of an adapter that is connected to the end of the pipe. Each of the locking arms is pivotally connected through a link to a single movable element whereby movement of the single movable element moves both of the locking arms into engagement with the inclined surface of the adapter simultaneously.

9 Claims, 3 Drawing Figures

PATENTED MAR 27 1973 3,722,549

INVENTORS
FRED A. WILSON
LINDOL H. SPRAGUE

BY *Kinney & Schenk*

ATTORNEYS

CAP AND LOCKING MEANS THEREFOR

This is a continuation of application Ser. No. 821,290, filed May 2, 1969.

In closing the end of a pipe that leads through the ground to a tank, for example, it is necessary that the cap, which closes the end of the pipe, be locked thereto so that there can be no accidental displacement or removal of the cap. Furthermore, there must be a seal between the cap and the pipe when the tank contains a potentially explosive fluid such as gasoline, for example. Otherwise, the fumes from the gasoline will escape from the tank, and an explosion might result.

It has previously been suggested to lock a cap to the end of the pipe by employing a pair of locking arms or cams. However, these arms or cams have been separately actuated whereby the user was required to employ both hands to attempt to obtain simultaneous positioning of both of the locking arms or cams in the locking position. Both of the arms or cams should be locked simultaneously to obtain the best possible seal between the cam and pipe. In the previously suggested device it is very difficult to lock both arms or cams simultaneously. Since one of the locking arms usually locked before the other, there would not be as good a sealing relation between the cap and the pipe as in the present invention. This would not be known until the presence of fumes was noticed. By this time, if the fumes were gasoline vapors, for example, an explosion might have resulted.

It also is necessary to not utilize an additional area for the actuating mechanism for the locking arms. If the actuating mechanism utilizes a substantially larger area than the pipe when moving the locking arms, this can limit the utilization of the locking device.

The present invention satisfactorily overcomes the foregoing problems by providing a device in which only a single hand of the user is required to move the locking arms to a locking position. Furthermore, the present invention utilizes an actuating mechanism in which there is no requirement for an additional area for the mechanism for moving the locking arms. Additionally, the actuating mechanism of the present invention locks the locking arms so that there is equal distribution of force on the seal to insure an efficient seal to prevent leakage of fumes.

An object of this invention is to provide a device for locking a cap on a pipe or the like.

Another object of this invention is to provide a locking device for a cap that requires only a single actuating member to lock the cap to the pipe or the like.

A further object of this invention is to provide a locking device for locking a cap to a pipe or the like in which no additional area is required for the actuating mechanism for the locking arms of the locking device.

Other objects, uses, and advantages of this invention are apparent upon a reading of this description, which proceeds with reference to the drawing forming part thereof and wherein.

Figure 1:
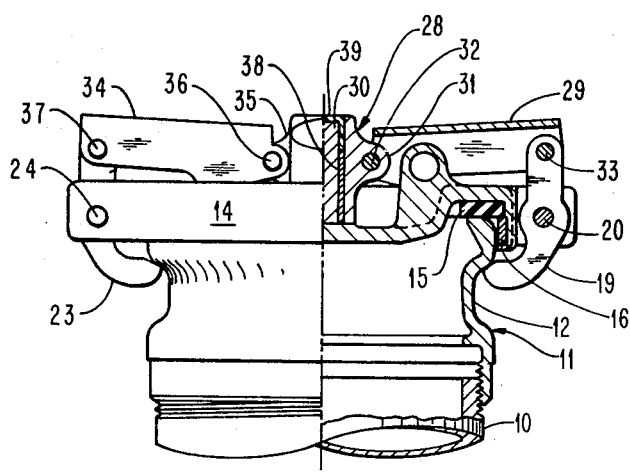
FIG. 1 is a side elevation view of the cap of this invention locked in position on a tank filling pipe.

Referring to the drawing and particularly FIG. 1, there is shown a pipe 10, which may be connected to a tank or the like containing gasoline, for example. The tank would be disposed beneath the ground, and the pipe 10 would extend upwardly therefrom and above the ground.

An adapter 11 is threaded to the pipe 10 in sealing relation therewith and has a circumferential groove 12 formed therein. A cap 14 cooperates with the end of the adapter 12 to close the pipe 10.

The cap 14 has a sealing gasket 15 mounted therein for cooperation with one end of the adapter 12 to form a seal between the cap 14 and the adapter 12 to prevent the escape of any fumes or fluid when the cap 14 is locked to the adapter 12. The sealing gasket 15 is maintained within the cap 14 by a ring 16, which is preferably press-fitted into the cap 14 to retain the sealing gasket 15 within the cap 14.

Figure 2:
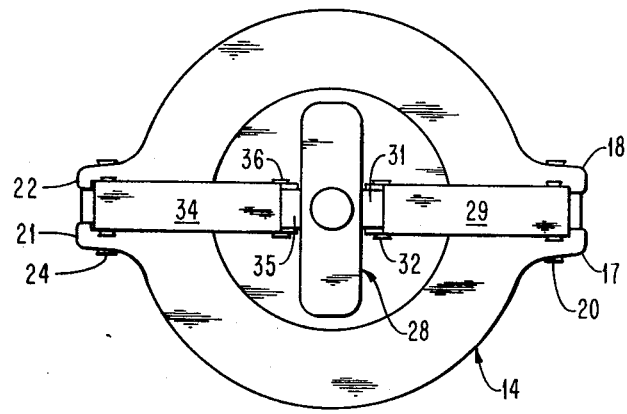
FIG. 2 is a top plan view of the cap of FIG. 1.

The cap 14 has a pair of ears 17 and 18 (see FIG. 2) extending from one side thereof with a locking arm 19 pivotally mounted on the cap 14 between the ears 17 and 18 by a pin 20. The cap 14 has a second pair of ears 21 and 22, which are diametrically disposed to the ears 17 and 18. A locking arm 23 is pivotally connected to the cap 14 between the ears 21 and 22 by a pin 24.

When the locking arms 19 and 23 are in the position of FIG. 1, a flat surface 25 (see FIG. 3) of the locking arm 19 cooperates with an inclined surface 26 on the adapter 11. The inclined surface 26 is formed adjacent the groove 12. The locking arm 23 has a flat surface 27, which is similar to the flat surface 25, for cooperation with the inclined surface 26 of the adapter 11.

The locking arm 19 is connected to a handle 28 by a link 29. The handle 28 is slidable mounted on a projecting shaft or stud 30 of the cap 14 by being formed with a centrally disposed passage. One end of the link 29 is pivotally connected to an ear 31 on the handle 28 by a pin 32. The other end of the link 29 is pivotally connected to one end of the locking arm 19 by a pin 33.

The locking arm 23 is connected to the handle 28 by a link 34. One end of the link 34 is pivotally connected to an ear 35 of the handle 28 by a pin 36. The other end of the link 34 is pivotally connected to one end of the locking arm 23 by a pin 37.

To enable the handle 28 to easily slide on the shaft or stud 30 of the cap 14, a bearing or bushing 38 is fixed to the surface of the centrally disposed passage in the handle 28. A cap 39, which is preferably formed of a suitable plastic material, closes the end of the handle 28 to prevent dirt from entering between the bushing 38 and the shaft or stud 30.

Figure 3:
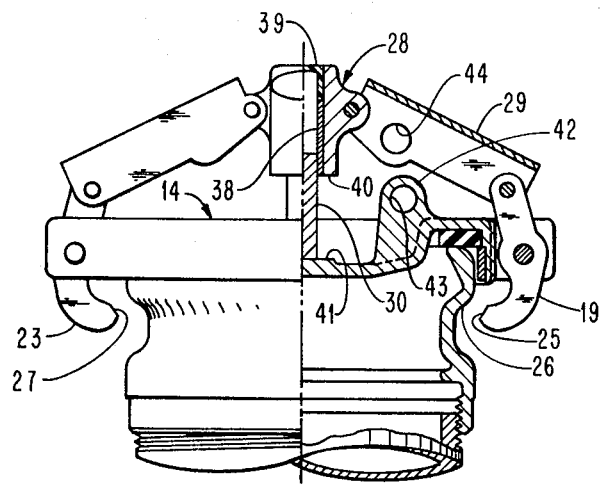
FIG. 3 is a view, similar to FIG. 1, but showing the actuating mechanism of the locking arms moved to the position in which the locking arms are not in the locking position.

Considering the operation of the present invention, the cap 14 is disposed on the end of the adapter 11 so that the sealing gasket 15 is in engagement with the end of the adapter 11 as shown in FIG. 3. Then, movement of the handle 28 toward the cap 14 causes the locking arms 19 and 23 to pivot about the pivot pins 20 and 24, respectively, until the flat surfaces 25 and 27 of the locking arms 19 and 23, respectively, simultaneously engage the inclined surface 26 of the adapter 11. When this occurs, the flat surfaces 25 and 27 cam along the inclined surface 26 to lock the cap 14 to the adapter 11. As a result, the end of the pipe 10 is completely sealed.

Movement of the handle 28 toward the cap 14 is limited by engagement of end 40 of the handle 28 with a flat surface 41 on the cap 14. Thus, the handle 28 rests on the flat surface 41 of the cap 14 rather than having the cap 39 support the handle 28 by engagement with the upper end of the shaft or stud 30.

When the handle 28 has moved to the position of FIG. 1, a plane connecting the pivot pins 32 and 36 is disposed closer to the cap 14 than a plane connecting the pivot pins 33 and 37. This arrangement insures that the locking arms 19 and 23 remain in the locking position until the handle 28 is pulled upwardly. Thus, any force on the cap 14 due to pressure within the tank to which the pipe 10 is connected causes a tighter locking arrangement.

To prevent any removal or displacement of the cap 14 by an unauthorized person, the present invention includes an arrangement for locking one of the links 29 or 34 to the cap 14 when the locking arms 19 and 23 are in the locking position. The locking arrangement includes a lug 42 extending from the cap 14 and disposed between parallel side walls of the link 29. The lug 42 has an opening 43 therein aligned with openings (one shown at 44 in FIG. 3) in each of the side walls of the link 29. This permits any type of a locking means to be passed through the aligned openings when the locking arms 19 and 23 are in the position of FIG. 1. Thus, this arrangement prevents any unauthorized person from actuating the mechanism of the present invention to open the end of the pipe 10.

The movement of the handle 28 away from the cap 14 is limited by engagement of each of the locking arms 19 and 23 with the cap 14. This engagement between the locking arm 19 and the cap 14 is shown in FIG. 3. A similar engagement exists between the locking arm 23 and the cap 14. Therefore, the handle 28 can not be moved beyond the position of FIG. 3 so that the handle 28 remains supported on the shaft or stud 30 of the cap 14.

While the present invention has shown the cap 14 as being circular, it should be understood that it could have any configuration. It is only necessary that the handle 28 be disposed at the center of the cap 14 to insure that equal distribution of the actuating force is applied to each of the locking arms 19 and 23. Of course, with a polygonal shaped cap, it might be necessary to have more than two of the locking arms since the locking arms must be symmetrically arranged.

While the sealing gasket 15 has been shown as mounted on the cap 14, it should be understood that it could be mounted on the adapter 11 if desired. Furthermore, if a pipe were specially constructed to have an inclined surface for cooperation with the flat surface 25 and 27 of the locking arms 19 and 23, respectively, the adapter 11 could be eliminated.

Additionally, if the locking arms 19 and 23 were arranged with a different configuration, the inclined surface 26 could be eliminated. Of course, there would have to be some type of abutting and locking surfaces between the locking arms 19 and 23 and the pipe 10 or the adapter 11 with which the locking arms cooperate.

An advantage of this invention is that a cap may be locked in sealing relation to a pipe with only one hand required. Another advantage of this invention is that there is simultaneous locking of all of the locking arms.

A further advantage of this invention is that it insures that there is an equal locking force applied by each of the locking arms. Still another advantage of this invention is that only a single motion is required to lock the cap on the end of the pipe. A still further advantage of this invention is that no additional space is required for the actuating mechanism for the locking arms. Yet another advantage of this invention is that there is an equal distribution of force on the seal from each of the locking arms.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A cap adapted to be mounted on the end of a pipe or the like to close the end of the pipe or the like, said cap having at least two locking arms pivotally attached on the external outer peripheral edge of said cap at equal angular distances from each other, each of said locking arms being pivotally mounted on said cap between the ends of said locking arm, at least two links, each link being pivotally connected to each locking arm adjacent one end of each locking arm, a handle pivotally connected to the other end of each of said links and movable toward and away from said cap, and each of said locking arms having a camming surface thereon adjacent its end remote from its pivotal connection cooperation with a surface carried by the pipe or the like when said handle is moved toward said cap to lock said cap to the end of the pipe or the like.

2. The cap according to claim 1 and an adapter for connection to the end of the pipe, said cap closing the end of the pipe by closing the end of said adapter, said adapter having the surface carried by the pipe or the like for cooperation with said surfaces of said locking arms to cause said locking arms to lock said cap to said adapter whereby said cap is locked to the pipe, and sealing means supported on one of said cap and said adapter to form a fluid seal between said cap and said adapter.

3. The cap according to claim 2 in which said sealing means is supported on said cap.

4. A cap adapted to be mounted on the end of a pipe or the like to close the end of the pipe or the like, said cap having at least two locking arms pivotally attached on the outer peripheral edge of said cap at equal angular distances from each other, each of said locking arms being pivotally mounted on said cap between the ends of said locking arm, at least two links, each link being pivotally connected to each locking arm adjacent one end of each locking arm, means to pivotally connect said links to each other adjacent the other ends thereof, each of said locking arms having its pivotal connection to said cap in substantial axial alignment with its pivotal connection to said connecting link when said cap is locked to the end of the pipe or the like, and each of said locking arms having a surface thereon adjacent its end remote from its pivotal connection to said connected link for cooperation with a surface carried by the pipe or the like when said pivotal connecting means is moved axially toward said cap to lock said cap to the end of the pipe or the like.

5. The cap according to claim 4 in which each of said links has its pivotal connection to said pivotal connecting means closer to said cap than its pivotal connection to said locking arm when said locking arms are in locking position.

6. The cap according to claim 1 including guide means supported by said cap to cooperate with said handle to guide said handle for movement only in the axial direction.

7. The cap according to claim 1 in which said handle is axially aligned with the pipe or the like.

8. The cap according to claim 1 including means to lock said locking arms in the locking position.

9. A cap having an axially disposed stud and adapted to be mounted on the end of a pipe or the like to close the end of the pipe, a pair of opposed locking arms pivotally mounted to said cap at first pivot points on the peripheral edge of said cap and adapted to cooperate with an outside peripheral surface on said pipe or the like to lock said cap to the end of said pipe or the like, single movable means axially aligned with said pipe and operatively connected to said locking arms to simultaneously move both of said locking arms to the locking position, said movable means including means axially slidably mounted on said stud, and a pair of link means pivotally connecting said slidably mounted means to each of said locking arms, one end of each said link means pivotally connected to said slidably mounted means at second pivot points on said slidably mounted means and the other end of said link means pivotally connected at third pivot points to one end of said locking arms, said second pivot points being closer to said cap than said third pivot points when said arms are in locking position, and said third pivot points being closer to said cap than said second pivot points when said arms are in unlocking position, said first and third pivot points being axially aligned when said arms are in locking position.

\* \* \* \* \*